April 23, 1940.    G. W. P. VAN DER HEIDEN    2,198,278
APPARATUS FOR MEASURING ACCELERATIONS AND RETARDATIONS
Filed March 22, 1938    3 Sheets-Sheet 1

April 23, 1940.  G. W. P. VAN DER HEIDEN  2,198,278
APPARATUS FOR MEASURING ACCELERATIONS AND RETARDATIONS
Filed March 22, 1938    3 Sheets-Sheet 3
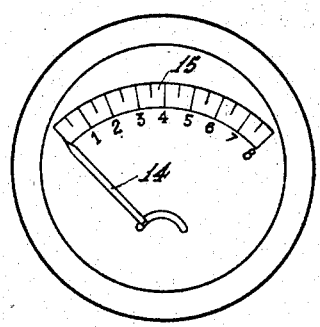
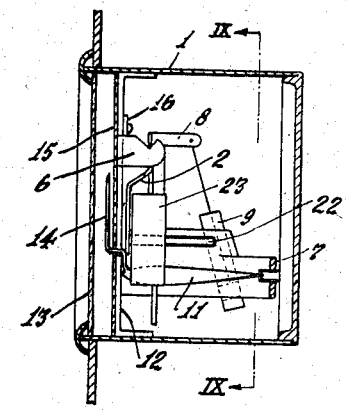
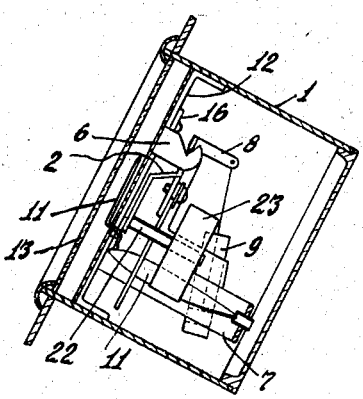
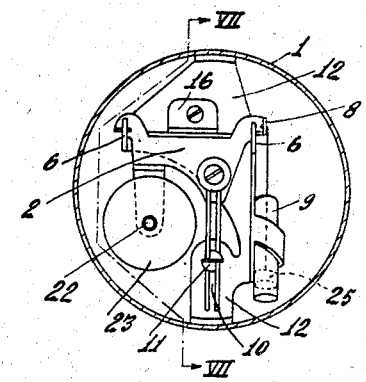
Inventor
G. W. P. van der Heiden
By C. F. Wenderoth
Atty Patented Apr. 23, 1940

2,198,278

UNITED STATES PATENT OFFICE 2,198,278

APPARATUS FOR MEASURING ACCELERATIONS AND RETARDATIONS

Gerard Willem Peter van der Heiden, Maastricht, Netherlands

Application March 22, 1938, Serial No. 197,500
In the Netherlands March 25, 1937

4 Claims. (Cl. 264—1)

The present invention relates to apparatus for measuring accelerations and retardations and more particularly to those arranged in vehicles for recording the brake-capacity or the road-resistance.

Many apparatus are known for indicating the said values. In the U. S. Patent No. 1,712,055 for instance a device has been disclosed, based upon the action of masses which oscillate about an axis. In this case both masses turn round a vertical shaft and the construction is very complicated.

The apparatus according to the invention is characterized by the provision of a pendulum suspended without friction by two horizontal arms, ground in the form of a chisel, which when oscillating from its gravity-equilibrium position effects the rotation of a shaft carrying an indicator and comprising a regulating surface, resembling a twisted strip.

In this manner the effect is attained that in all positions the shaft fits accurately into the slot in the pendulum. For the sake of simplicity this shaft will be hereinafter referred to as the "torsion-shaft."

This apparatus may be mounted as an auxiliary device in the instrument panel, particularly for the benefit of car-users, who appreciate being able to determine at any moment the condition of the brakes or the adhesion between the tire and the road. A portable device, not permanently mounted in a car, may serve for brake testing by police, traffic-inspection and for use by car-dealers. The apparatus can also serve for the purpose of determining the road-resistance of a car, e. g., for the determination of the air-resistance at different speeds of cars, locomotives, etc.

The arrangement of the apparatus upon the facia board or against the wind screen facilitates the reading and enables an exact reading of the instrument to be obtained by the car-driver in a safe way, as he keeps his eye during the reading on the road, and it is not necessary to try to read the position of the pointer in the dark at the bottom of the car. This also applies for brakes testing by the police, etc.

As long as the car moves at constant speed on the level, no horizontal force acts upon the pendulum mass, so that it moves with the same uniform speed as the car. When the apparatus experiences a resistance, e. g., when braking, a retardation acts upon the mass and the pendulum adjusts itself according to the direction of the resultant of the gravity and the force of inertia.

This force of inertia is naturally proportional to the total resistance experienced by the car.

The tangent of the angle of the pendulum, with the vertical and not the angular displacement of the pendulum, is proportional to the force of inertia. The displacement of the indicator consequently is also proportional to the force of inertia, thus, to the brake retardation.

In order to damp out oscillations of the pendulum, in most cases an oscillation damper will be applied. Generally when subdividing the dial plate, it is possible to take into account the bending of the front-springs of the vehicle and the release of the rear-springs during the use of the brakes. As to this end an average value is taken, the indication for cars with large wheel base and stiff springs is a few percent too small, and for cars with small wheel base and slack springs a few percent too large.

The invention will be illustrated by means of the appended drawings.

Fig. 6 is a part view of an apparatus, similar to that shown in previous figures, but intended to be mounted in the instrument panel.

Fig. 7 shows a vertical sectional view taken on the section line VII—VII of Fig. 9 and in which the apparatus is shown mounted on a vertical instrument panel, the pendulum weight being disposed on the outer end of the screw.

Fig. 8 shows a vertical sectional view taken on section line VII—VII of Fig. 10 but with the apparatus shown as mounted in a slanting instrument panel and by screwing back the pendulum weight on the screw the pendulum part with the slot is disposed perpendicular to the torsion shaft or in other words the indicator is again set on zero.

Fig. 9 is a sectional view taken on the section line IX—IX of Fig. 7 showing the form of the frame 12 and the pendulum.

Figure 1:
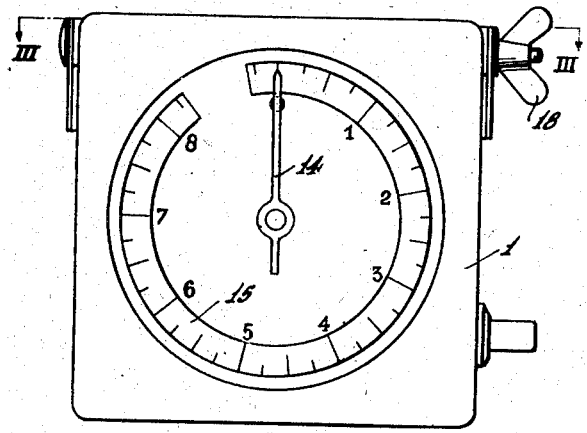
Fig. 1 shows a front view of a portable brake testing apparatus according to the invention.
Figure 2:
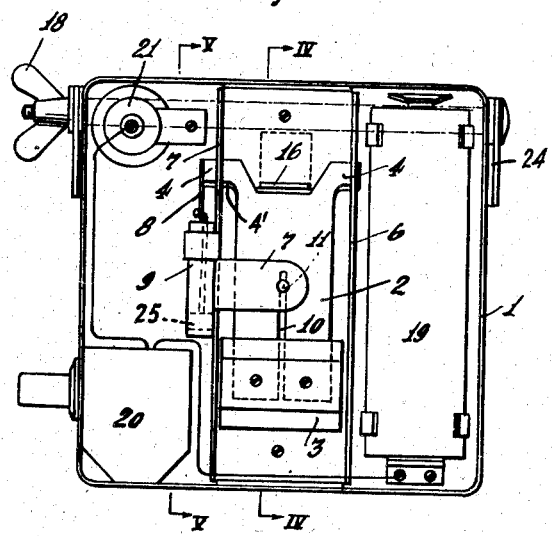
Fig. 2 is a back view of the same with the casing opened.

In the casing 1 in the first place is arranged the main part of the apparatus, to wit: the pendulum, consisting of the arm 2 with the pendulum weight 3 mounted on it. The arm comprises parts 4 with knife edge portions 4', by means of which the pendulum is suspended with little friction in recesses 5 of the plate parts 6 and 7. One knife part 4 has been extended to form a side arm 8, which is connected to an oscillation damper 9 with piston 25. This oscillation damper which has been indicated in the drawings as an air cylinder, serves to prevent inconvenient oscillations of the indicator and consequently enables the apparatus to be read easily and avoids the possibility of obtaining temporarily too high indications. The pendulum arm 2 comprises a slot 10, in which a torsion shaft 11 is arranged. This shaft is supported by the plate 7 and front plate 12 of the apparatus.

At the end of the shaft, outside the casing, but behind the glass plate 13, an indicator 14 is mounted. A scale is carried by a plate 15.

The portable apparatus is mounted in a U-shaped plate 24, which is placed against the windshield or the instrument panel by means of rubber suction caps.

The "torsion-shaft" cannot be obtained by simply twisting a strip. It may be true that the apparatus could work with such a twisted strip, but as the straight lines in the helical surfaces are always at right angles to the torsion-shaft, the pendulum would stick in case of even a small displacement from the zero-position, when the slot fits accurately round the shaft—which is of course necessary for an exact indication.

Figure 3:
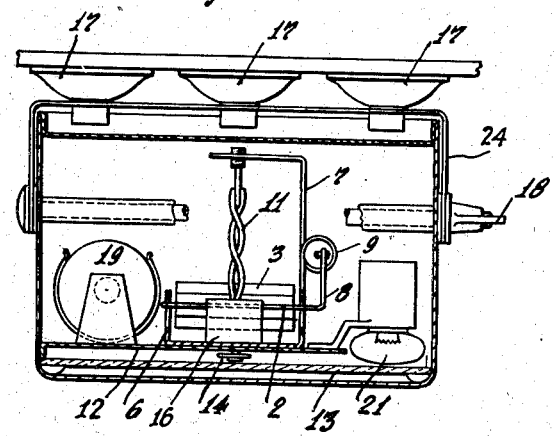
Fig. 3 shows a horizontal section through the apparatus taken on section line III—III of Fig. 1.
Figure 4:
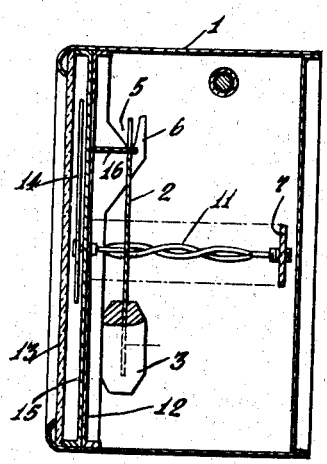
Fig. 4 shows a vertical section taken on section line IV—IV of Fig. 2.
Figure 5:
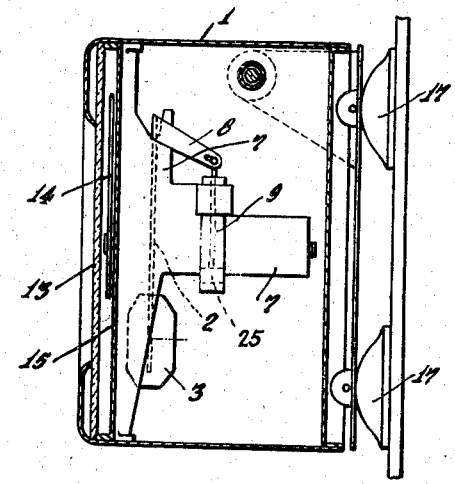
Fig. 5 shows a vertical sectional view taken on the section line V—V of Fig. 2.

According to the invention, in the torsion-shaft of the apparatus, the straight lines in the side surfaces form with the shaft an angle varying from 90° at the point where the slot engages the shaft at a pendulum position corresponding to a retardation=0, until 45° at the point where this is the case at a pendulum position corresponding to an acceleration of 10 m./sec.² (force of inertia=gravity). Hence it consequently follows that the two helical lines formed by the narrow sides of the torsion-shaft have each a different pitch, the difference between the pitches being equal to the diameter of the shaft if the shaft makes one complete revolution between the zero-position of indication and the point of indication of 10 m./sec.² brake retardation. This same effect is also attained when using a shaft as shown in Figures 3 and 4 of the drawings, and comprising for instance a steel central wire about which two metal wires, e. g., of brass of the same thickness, have been wound. The pitch of the helical lines differs with the distance of the brass wires from centre to centre over a length of the shaft equal to the distance of the steel shaft to the suspension point of the pendulum. The helical thread, which always occupies the lowermost position in the slot of the pendulum, has the larger pitch.

If the wires would have the same pitch the centres of the wires would not always be situated in a line passing through the suspension axis of the pendulum, so that the slot in the pendulum should have to be of unequal width. With the different pitch the effect is attained that in each position of the pendulum the axis points of the three threads are situated in the centre line of the slot.

In order to prevent a displacement in the upward direction by shocks, the pendulum is also retained at the upper side. For this purpose a strip 16 is bent backward from the metal of the plate 12 and holds the pendulum down. As the arm 2 of the pendulum at the place of the pivots has been ground in the form of a chisel, the contact points at the upper and the lower side are situated in one line, so that the friction is a minimum.

It is clear that when the pendulum moves out of its gravity-equilibrium position, the shaft 11 is forced to turn into the slot 10, so that the pointer 14 gives an indication.

The portable apparatus can be fixed by means of three rubber suction cups 17 against the dashboard or the windscreen of the car. The rubber suction caps are connected to a U-shaped frame plate 24, to which the casing of the apparatus is pivotally connected. The wing nut 18 makes it possible to adjust the instrument for any angle of the glass or instrument panel into the vertical position in which the pointer is at zero.

In the case of an apparatus which is to be permanently mounted, the angular position of the casing cannot be changed. In order to be able to adjust the pointer nevertheless to zero, the pendulum is constructed in two pieces which are adjusted with regard to each other in such a way that the slot in the pendulum is at right angles to the torsion-shaft when the pendulum weight is vertically below the suspension point.

According to Figures 6, 7, 8 and 9 the pendulum weight 23 can be adjusted on the screw 22, whereas the torsion-shaft 11 passes through the pendulum arm 2 at the other side of it.

When the longitudinal axis of the instrument is inclined by mounting on a sloping instrument pawl (Fig. 8) the portion of the pendulum arm containing the slotted portion engaging the pointer actuating screw can be adjusted so that in its initial position it is substantially at right angles to the pointer actuating screw, by adjustment of the weight 23 along the threaded support 22.

In order to be able to read the instrument also at night, a battery 19, a push button 20 and a bulb 21 have been inserted in the apparatus. The bulb is screened at the front side and lights the dial plate.

The apparatus can also be constructed as an acceleration meter and, if desired, as a combination of a brake control and an acceleration meter, this combination being of particular use to car-dealers. It is clear that when using the apparatus as an acceleration meter, the pendulum will oscillate backward when the car is started, and for this purpose, and also when the instrument is to be used as a combined acceleration and retardation meter, the pendulum is arranged further towards the rear of the casing.

I claim:

1. Apparatus for measuring accelerations and retardations comprising a freely suspended pendulum having a slot therein, a shaft member mounted for rotation about its longitudinal axis and carrying an indicating element, helical elements carried by said shaft and engaging the pendulum slot, the portion of the helix engaging the slot at an inner radial point from the pendulum pivot is formed with a less pitch than the portion of said helical element contacting the slot at a radially outer portion thereof from the pivotal axis of the pendulum.

2. Apparatus according to claim 1, wherein the part of the shaft which works in said slot, is formed of twisted strip and is such that one edge of the strip forms a helix of greater pitch than the other edge and said part is arranged to work in the slot so that the point of the edge of larger pitch engaged by the slot in any given position of the pendulum is more remote from the point of support of the pendulum than the corresponding point of the edge of smaller pitch.

3. Apparatus according to claim 1, wherein said part of the shaft which works in said slot is formed by two wire helices, which differ in pitch, jointed together so that their axis coincide, and said part is arranged to work in the slot so that the point of the wire helix of larger pitch engaged by the slot in any given position of the pendulum is more remote from the point of support of the pendulum than the corresponding point of the wire helix of smaller pitch.

4. Apparatus according to claim 1, wherein the pendulum arm is provided with a threaded support inclined to said arm, a pendulum weight with a threaded bore and adjustable along said threaded support.

GERARD WILLEM PETER van der HEIDEN.